(12) United States Patent
Levsen

(10) Patent No.: US 8,037,611 B2
(45) Date of Patent: Oct. 18, 2011

(54) ROTARY KNIFE WITH BLADE BUSHING

(75) Inventor: Clark A. Levsen, Shawnee, KS (US)

(73) Assignee: Hantover, Inc., Kansas City, MO (US)

( * ) Notice: Subject to any disclaimer, the term of this patent is extended or adjusted under 35 U.S.C. 154(b) by 806 days.

(21) Appl. No.: 11/839,382

(22) Filed: Aug. 15, 2007

(65) Prior Publication Data

US 2007/0283574 A1 Dec. 13, 2007

Related U.S. Application Data

(63) Continuation-in-part of application No. 11/423,266, filed on Jun. 9, 2006, now abandoned.

(51) Int. Cl.
*A22C 17/04* (2006.01)

(52) U.S. Cl. ............... 30/276; 30/347

(58) Field of Classification Search ........... 30/276, 30/346, 329, 347, 282, 283, 123, 289; 452/133, 452/134
See application file for complete search history.

(56) References Cited

U.S. PATENT DOCUMENTS

| | | | | |
|---|---|---|---|---|
| 3,269,010 A | * | 8/1966 | Bettcher | 30/276 |
| 4,236,531 A | * | 12/1980 | McCullough | 30/276 |
| 4,363,170 A | * | 12/1982 | McCullough | 30/276 |
| 4,509,261 A | * | 4/1985 | Bettcher | 30/276 |
| 4,734,982 A | | 4/1988 | Khoja | |
| 6,615,494 B2 | | 9/2003 | Long | |
| 6,769,184 B1 | * | 8/2004 | Whited | 30/276 |
| 7,131,843 B1 | | 11/2006 | Tang | |
| 2003/0131482 A1 | | 7/2003 | Long et al. | |

FOREIGN PATENT DOCUMENTS

| EP | 0974431 A1 | 1/2000 |
|---|---|---|
| EP | 1864576 A1 | 12/2007 |

OTHER PUBLICATIONS

PCT International Search Report and Written Opinion dated Nov. 7, 2008 for corresponding Application No. PCT/US2008/072367 filed Aug. 6, 2008.

* cited by examiner

*Primary Examiner* — Stephen Choi
(74) *Attorney, Agent, or Firm* — Hovey Williams LLP

(57) ABSTRACT

A powered rotary knife includes a handle, a blade housing, an annular blade, and a blade bushing for rotatably mounting the blade within the housing. The blade housing includes an inner groove that is operable to receive the blade bushing therein. The blade housing and blade bushing are split in order to expand and receive the blade. The blade includes an outer groove that is also operable to receive the blade bushing. Thus, the blade bushing is spaced between the blade housing and blade and rotatably secures the blade within the blade housing.

41 Claims, 4 Drawing Sheets

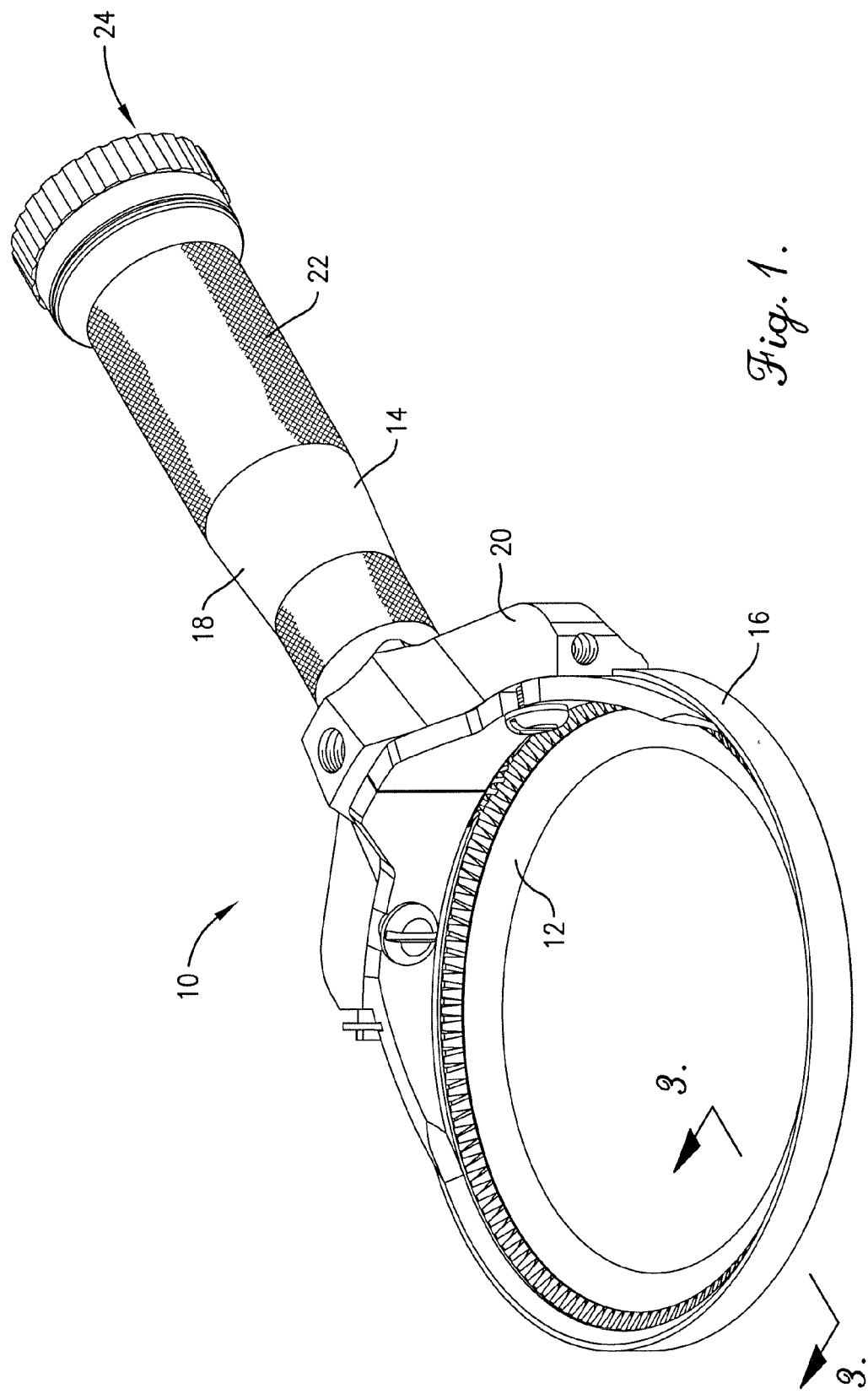

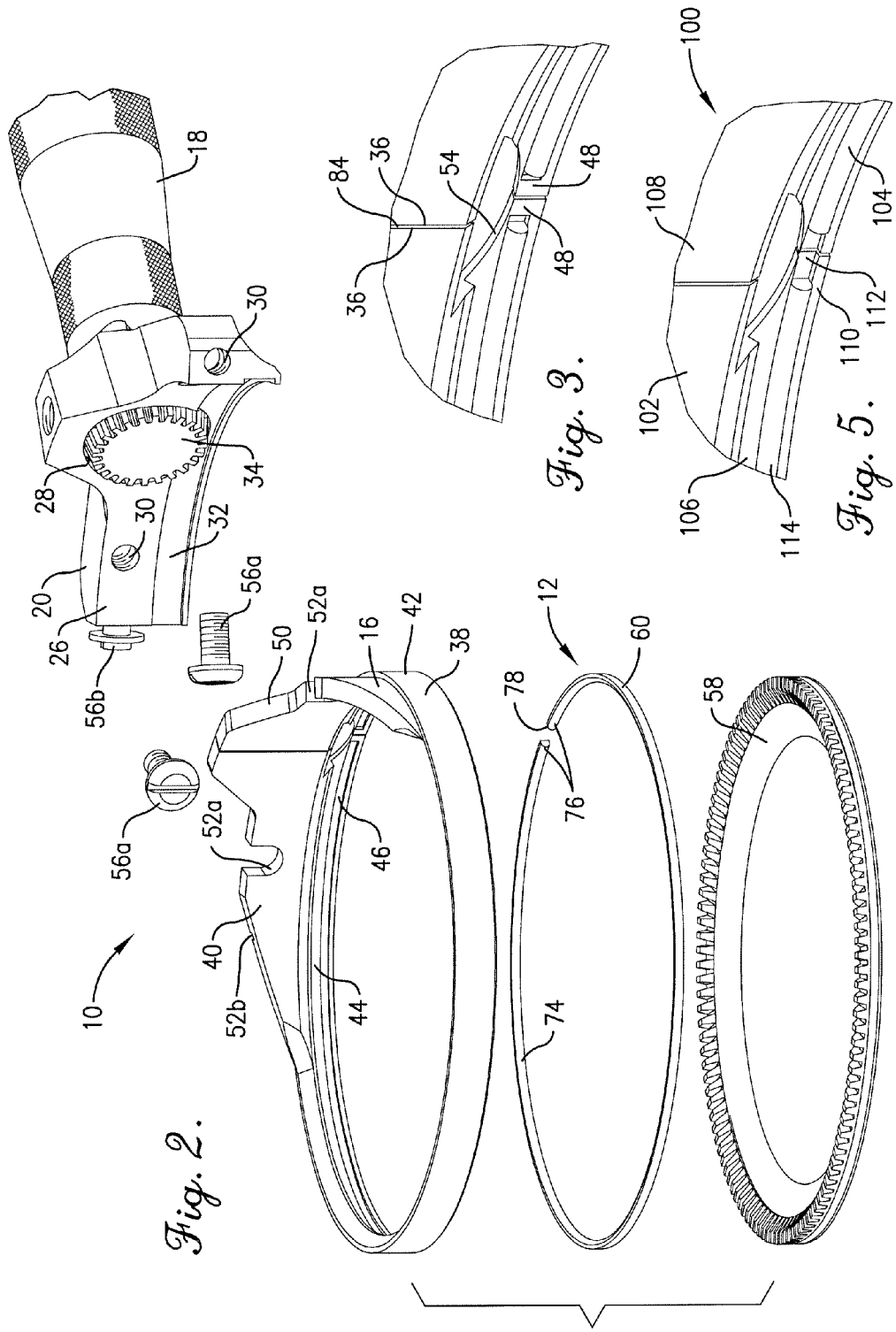

ROTARY KNIFE WITH BLADE BUSHING

RELATED APPLICATION

This application is a continuation-in-part of application Ser. No. 11/423,266 filed Jun. 9, 2006, and entitled ROTARY KNIFE WITH BLADE BUSHING, which is hereby incorporated by reference herein.

BACKGROUND OF THE INVENTION

1. Field of the Invention

The present invention relates generally to powered knives, such as those commonly used in slaughterhouses for meat processing. More specifically, the present invention concerns a rotary knife with a rotating annular blade and an annular bushing for supporting the blade.

2. Discussion of Prior Art

Powered knifes that are used in the meat processing industry for dressing an animal carcass are known in the art. The process of dressing the carcass normally involves the removal of meat and fat from various bones as well as cutting various bones. Powered knifes enable workers to perform this process with much greater efficiency than with traditional, unpowered knives. Among these prior art powered knives are rotary knives that include a rotating annular blade. Many of these rotary knives are electrically powered and are able to spin the annular blade at very high rotational speeds.

Rotary knives are problematic and suffer from certain limitations. For example, the high-speed rotational movement of the annular blade, which is ideal for quickly and efficiently processing meat, causes the cutting edge of the annular blade to quickly become dull and require frequent replacement. Generally, the speed at which the annular blade turns also causes undesirable wear of the non-cutting surfaces of the blade as well as other components of the knife. Rotary knives also suffer from problems associated with installation of the annular blade. For example, the prior art rotary knives require precise alignment of the blade within the housing. Misalignment of the blade is common, especially when blades are quickly replaced, and such misalignment generally can result in excessive wear of knife components or binding of the blade within the knife. For this and other reasons, prior art knives are deficient at permitting quick and efficient blade replacement. All of these problems are exacerbated by the extended and continuous period of use that is prevalent in the industry; commonly, a user will operate the same knife for an eight hour work day, five days per week. Accordingly, there is a need for an improved powered rotary knife that does not suffer from these problems and limitations.

SUMMARY OF THE INVENTION

A first aspect of the present invention concerns a rotary knife driven by a power source. The rotary knife broadly includes a grasping handle, a blade housing, an annular blade, and an annular bushing. The blade housing is mounted to the handle. The annular blade is operable to be driven by the power source. The housing includes an annular inner race. The blade includes an annular outer race in an opposed relationship with the annular inner race. The annular bushing is received within both races. The annular bushing is operable to rotatably support the blade relative to the blade housing.

A second aspect of the present invention concerns a replacement blade assembly for a rotary knife driven by a power source, wherein the rotary knife includes a housing with an annular inner race. The replacement blade assembly broadly includes an annular blade and an annular blade-supporting bushing. The annular blade is operable to be driven by the power source. The blade includes an annular outer race configured to be in an opposed relationship with the annular inner race. The annular blade-supporting bushing is received in the annular outer race and is configured to be received in the annular inner race. The annular blade-supporting bushing is operable to support the blade relative to the housing.

A third aspect of the present invention concerns an annular blade-supporting bushing for a rotary knife driven by a power source, wherein the rotary knife includes a housing and a blade rotatably supported relative to the housing, with the housing and blade including races that are in an opposed relationship. The annular blade-supporting bushing broadly includes an elongated body. The elongated body terminates at spaced-apart ends and presents a circumferential length between the ends. The body is configured to be received in the races and thereby supports the blade relative to the housing. The body is deformable to permit positioning of the body between the races and to assume a generally circular shape when positioned therein, with the ends being in close proximity with one another so as to form an essentially endless bearing surface.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 1 is an upper perspective view of a rotary knife constructed in accordance with a preferred embodiment of the present invention;

FIG. 2 is an exploded perspective view of the rotary knife shown in FIG. 1, showing the handle assembly, blade housing, annular blade, and annular bushing;

FIG. 3 is an enlarged fragmentary perspective view of the rotary knife shown in FIGS. 1 and 2, showing the inner annular surface of the blade housing with the annular bushing installed therein;

FIG. 5 is an enlarged fragmentary perspective view of a second embodiment of the rotary knife, showing an alternative blade housing with an uninterrupted inner annular groove for receiving the annular bushing;

Figure 4:
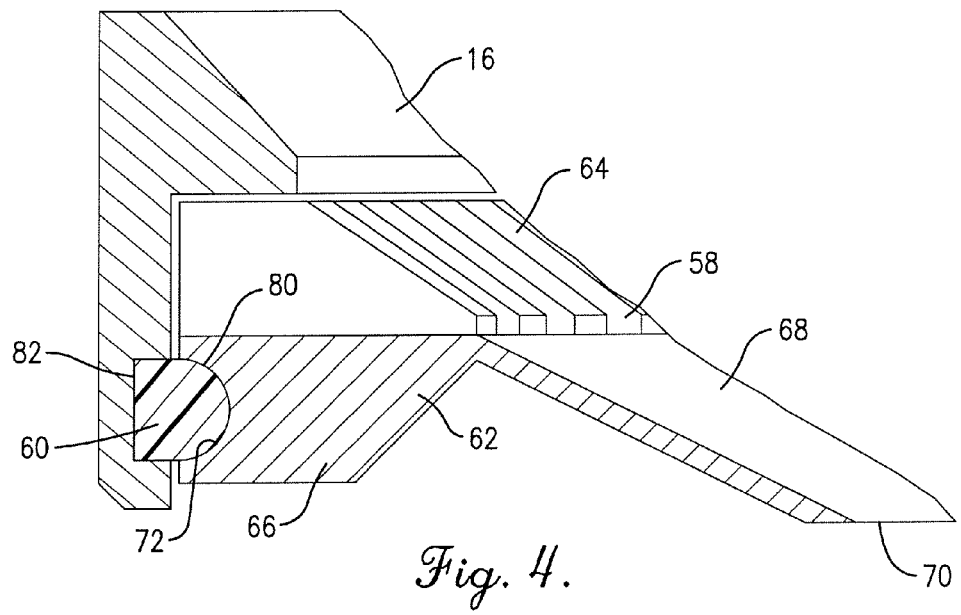
FIG. 4 is a fragmentary sectional view of the rotary knife shown in FIGS. 1 and 2, showing the housing, blade, and bushing.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

As shown in FIG. 1, the rotary knife 10 selected for illustration is particularly suitable for use in an animal slaughterhouse operation for dressing an animal carcass, although other knife applications are entirely within the ambit of the present invention. The illustrated rotary knife 10 preferably includes an annular, rotating blade assembly 12. The illustrated rotary knife 10 is preferably pneumatically powered by a pressurized air source (not shown), e.g., an air compressor. However, the principles of the present invention are equally applicable where the rotary knife is driven by alternative external power sources which transmit power through hydraulic power or electrical power. The rotary knife 10 broadly includes a handle 14, a blade housing 16, and the rotating blade assembly 12.

Turning to FIGS. 1 and 2, the handle 14 includes a grip housing 18 and a base 20. The grip housing 18 includes a knurled outer surface 22 for enhancing the friction between a user's hand and the grip housing 18. The grip housing 18 also includes a connector end 24 for interfacing with a pneumatic supply line (not shown). The grip housing 18 further includes an internal cavity (not shown) that houses a pneumatic motor (not shown).

The base 20 is attached to the grip housing 18 and includes an arcuate receiving surface 26, a gear-receiving socket 28, and threaded holes 30. The arcuate receiving surface 26 includes a groove 32 for receiving the blade housing 16 as will be discussed. The socket 28 is sized to receive and permit rotation of a spur gear 34. The spur gear 34 is interconnected with and is driven by the pneumatic motor.

The split blade housing 16 is substantially unitary and annular and includes adjacent ends 36, an annular ring 38, and a flange 40. The ring 38 includes an outermost arcuate surface 42 and an inner surface 44 including a groove 46 which serves as a race for rotatably supporting the blade assembly 12 as will be discussed. The groove 46 includes end walls 48 that are spaced adjacent the ends 36, the purpose of which will be discussed in greater detail. Between the ends 36, the groove 44 extends substantially along the perimeter of the ring 36. The flange 40 includes an arcuate wall 50 with fastener slots 52*a*,52*b*. While the illustrated blade housing 16 includes the single groove 46, it is consistent with the principles of the present invention for the blade housing 16 to include multiple grooves for engagement with the blade assembly 12. Moreover, it is also within the ambit of the present invention for the groove 46, which is illustrated to include a concave and arcuate cross-sectional profile, to include other alternative concave or convex profiles or other surface features. For example, an alternative embodiment of the present invention that will be discussed in further detail includes a groove with terminating stops spaced on either side of the ring split.

The blade housing 16, as well as the handle 14, are preferably manufactured from a tempered steel to resist oxidation and corrosion within the adverse environment of a slaughterhouse. However, the principles of the present invention are equally applicable where the blade housing 16 and handle 14 include other metallic or non-metallic materials such as brass, aluminum, or stainless steel. The blade housing 16 or handle 14, either entirely or partly, may alternatively include an outermost layer of brass, aluminum, or stainless steel that is suitable for surface-to-surface engagement with the blade assembly 12. In this manner, such an outermost layer, whether coated, adhered, or otherwise secured onto the base material, may provide an optimal surface for low-friction bearing engagement with the blade assembly 12. However, the outermost layer may be included for other purposes, such as corrosion resistance, aesthetic qualities, or other performance requirements.

The blade housing 14 attaches to the base 20 by placing the outermost arcuate surface 42 within the groove 32 and aligning the spur gear 34 with a gear-receiving socket 54 that extends into the ring 38 and flange 40. Fasteners 56*a* extend through the slots 52*a* and into the threaded holes 30 in the base 20. Threaded adjuster 56*b* is threaded into another of the holes 30 and includes a head that is partly received within slot 52*b*. When the oppositely spaced adjacent end 36 is secured to the base 20 by one of the fasteners 56*a*, the threaded adjuster 56*b* is operable to act against the ring 38 and force the adjacent ends 36 into close proximity with each other. In this manner, both slots 52*a* may be aligned with the respective holes 30 so that fasteners 56*a* may be extended therethrough and threaded into the respective holes 30. The blade housing 16 provides the nearly-continuous, annular inner surface 44 for receiving the blade assembly 12 therein as will be discussed in greater detail. The blade housing 16 also substantially covers the spur gear 34 while permitting intermeshing engagement between the spur gear 34 and the blade assembly 12.

Turning to FIGS. 2-4, the blade assembly 12 includes an annular blade 58 and an annular bushing 60. The blade 58 is unitary and is substantially continuous around its circumference. The blade 58 includes a blade wall 62 and a ring gear 64 extending from the blade wall 62 for mating with the spur gear 34. The blade wall 62 includes a support section 66 and a cutting section 68 spaced from the support section 66. The cutting section 68 includes a sharp cutting edge 70 and the support section 66 includes an arcuate outer groove 72. If desired, the blade 58 may be alternatively configured to include other types of edges. For example, instead of the sharp edge 70, the blade 58 could alternatively include an abrasive edge (e.g., with a surface that is gritted), a bristled edge, or a brush-type shredding edge. Similar to the blade housing 16, it is consistent with the principles of the present invention for the blade 58 to include multiple grooves for engagement with the bushing 60. Moreover, it is also within the ambit of the present invention for the groove 72, which is illustrated to include a concave and arcuate cross-sectional profile, to include other alternative concave or convex profiles or other surface features.

The blade 58 is preferably manufactured from tempered steel. However, similar to the blade housing 16 and handle 14, the principles of the present invention are applicable where the blade 58 includes other metallic or non-metallic materials, such as brass, aluminum, or stainless steel. Alternatively, the blade 58, either entirely or partly, may include an outermost layer of brass, aluminum, or stainless steel that is suitable for surface-to-surface engagement with the bushing 60. In this manner, such an outermost layer, whether coated, adhered, or otherwise secured onto the base material, may provide an optimal surface for low-friction bearing engagement. However, the outermost layer may be included for other purposes, such as corrosion resistance, aesthetic qualities, or other performance requirements.

The blade wall 62 extends radially inwardly from the outer groove 72 to the cutting edge 70 with the wall thickness reducing in size from the support section 66 to the cutting section 68. Thus, the cutting section 68 is radially inwardly directed for cutting. However, the principles of the present invention are equally applicable where the cutting section 68 is directed in a more axial direction, or in a radially outward direction. As will be discussed shortly, the blade 58 is spaced substantially concentrically to and is rotatably mounted within the ring 38 by the annular bushing 60.

The bushing 60 is preferably unitary and includes an annular body 74 with terminal ends 76 (see FIG. 2). The ends 76 are spaced adjacent to each other preferably such that the annular body 74 forms an essentially endless bearing surface.

The principles of the present invention are also applicable where the body 74 is in fact endless. The body 74 preferably has an outermost diameter of between about 1 to 5 inches, although other sizes are entirely within the ambit of the present invention. The ends 76 define a gap 78 therebetween of preferably less than about 1 inch and, more preferably, about 0.25 inches. As will be discussed, the bushing 60 is generally dimensioned and constructed so that it is operable to deform elastically during installation between the blade 58 and blade housing 16.

The annular body 74 includes an inner perimeter surface 80 and an outer perimeter surface 82. The illustrated inner perimeter surface 80 includes a convex, arcuate cross-sectional profile and the outer perimeter surface 82 includes a convex, rectangular cross-sectional profile. The bushing 60, consequently, presents a generally D-shaped cross-section although other bushing shapes and designs are entirely within the ambit of the present invention, That is, the principles of the present invention are also applicable where the surfaces 80,82 include alternative convex or concave profiles. Moreover, the principles of the present invention are also applicable to a bushing including multiple segments. For example, the bushing 60 may include a plurality of substantially circular segments that are spaced relative to each other (e.g., concentrically spaced, or axially spaced). Alternatively, the bushing 60 may include arcuate segments arranged in series in a substantially circular form. The principles of the present invention are further applicable where the bushing includes a bearing other than a journal bearing, such as a ball bearing.

The bushing 60 preferably includes an ABS plastic or an Acetal plastic such as Delrin®. However, the principles of the present invention are also applicable where the bushing 60 is constructed from plastic, other non-metallic, or metallic materials suitable for use in a bushing application. For example, the bushing 60, either entirely or partly, may include an outermost layer of brass, aluminum, or stainless steel that is suitable for surface-to-surface engagement with the blade 58 and blade housing 16. In this manner, such an outermost layer, whether coated, adhered, or otherwise secured onto the base material (e.g., plastic), may provide an optimal surface for low-friction bearing engagement. However, the outermost layer may be included for other purposes, such as corrosion resistance, aesthetic qualities, or other performance requirements.

When the bushing 60 is received within the groove 72, inner perimeter surface 80 is spaced within and is configured to substantially conform to the shape of the outer groove 72. The ends 76 are normally spaced adjacent to each other with the small gap remaining therebetween. Thus, the body 74 provides a substantially continuous circumference or bearing surface.

The blade assembly 12 is assembled onto the blade housing 16 by first inserting the bushing 60 into the groove 46. Insertion of the split bushing 60 occurs by initially placing one of the ends 76 into the groove 46 adjacent one of the end walls 48, which might require slight deformation of the bushing 60. Subsequently, the remainder of the bushing 60 may be placed within the groove 46 by inserting portions of the bushing 60 in a progressive sequence along the circumferential direction. When the bushing 60 is received within the groove 46, the outer perimeter surface 82 is spaced within and is configured to substantially conform to the shape of the groove 46. Also, the ends 76 are spaced adjacent to respective end walls 48 with the end walls 48 restricting relative rotational movement of the bushing 60 within the groove 46. However, the end walls 48 are preferably spaced so that the end walls 48 permit elongation of the bushing 60 due to any compression of the bushing 60 between the blade housing 16 and the blade 58.

The blade 58 is mounted within the blade housing 16 by first aligning the gap 78 of the bushing 60 with a housing gap 84. In this orientation, the blade housing 16 and bushing 60 are configured to be simultaneously and elastically deformed in an outward direction to expand in diameter, thus increasing the size of the gaps 78,84. This expansion permits the blade 58 to be placed therein with the groove 46 being in placed into an opposed relationship with the groove 72 (where "opposed relationship" is defined herein as the grooves 46,72 facing in opposite directions). Moreover, the illustrated grooves 46,72 are oppositely spaced from each other (with "oppositely spaced" defined herein as the grooves 46,72 being in opposed relationship and directly facing each other, i.e., not offset from each other along a common axis). Again, the principles of the present invention are applicable where the grooves 46,72 are in opposed relationship to each other. For example, an alternative pair of circular grooves may have a common axis but be offset from each other along the axis.

The blade housing 16 and bushing 60 are configured to return to their original shape. The flange 40 is arranged so that the slots 52a are aligned with threaded holes 30 and secured to the base 20 with the fasteners 56a. In particular, the adjacent end 36 opposite the slot 52b is secured to the base 20 by extending a fastener 56a through the corresponding slot 52a and into the corresponding hole 30. The threaded adjuster 56b is then threaded into the corresponding hole 30 with the head of the adjuster 56b being partly received within the slot 52b. In this manner, the adjuster 56b acts against the ring 38 to force the ends 36 into close proximity until the slots 52a are aligned with heir respective holes 30. Subsequently the other fastener 56a may be inserted through corresponding slot 52a and hole 30 to secure the flange 40 to the base 20.

Except for the inventive aspects, the knife 10 may be constructed similar to conventional designs. For example, one suitable knife configuration is available under the designation Wizard Trimmer Series, Model M and M2 Series from Bettcher Industries, Inc. of Birmingham, Ohio, although the blade and/or blade housing of such conventional knives may have to be altered or replaced with inventive features or components.

In use, driving connection between the blade 58 and power source is controlled by the user. When power is provided to the blade 58 (e.g., by manual operation of a trigger, switch, foot pedal, etc.) the blade 58 is caused to rotate relative to the bushing 60 and housing 16. The bushing 60 is particularly useful in permitting low-friction relative movement between the housing 16 and blade 58. Furthermore, any slight (but operationally significant) misalignment between the blade 58 and housing 16 can often be accommodated by the bushing 60. Yet further, the bushing 60 permits the use of relatively tight tolerances in its engagement with the blade 58 and housing 16, as well as being inexpensive and capable of being discarded after use (e.g., on a daily basis), both of which enhance cleanliness of the knife 10.

Figure 6:
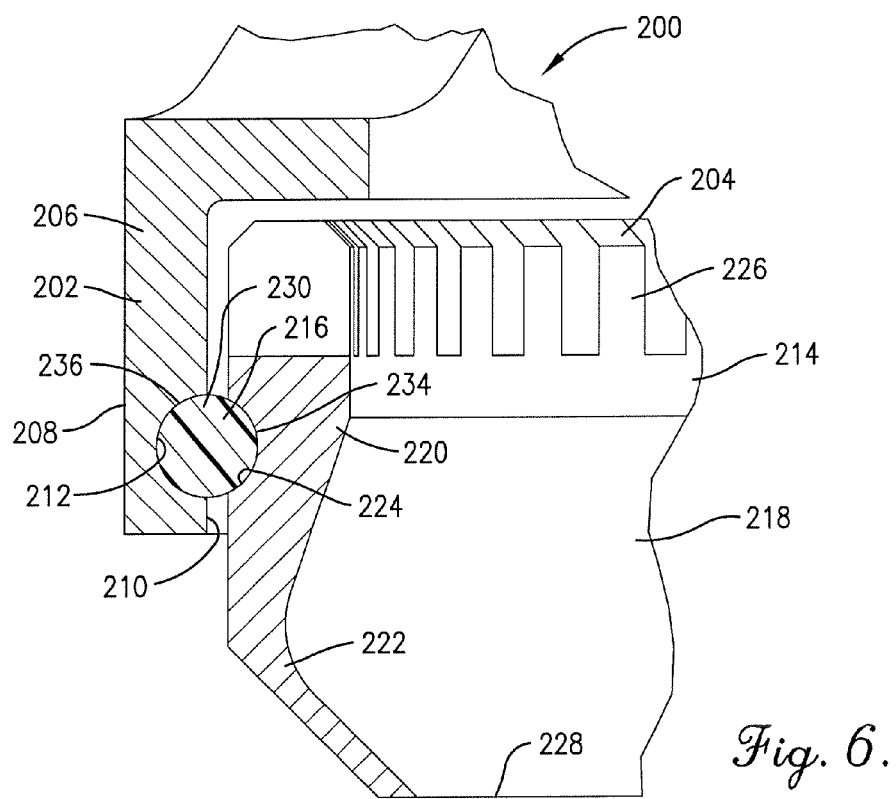
FIG. 6 is a fragmentary sectional view of a third embodiment of the present invention, showing an alternative blade housing, an alternative blade, and an alternative annular bushing.

FIGS. 5 and 6 illustrate alternative embodiments of the present invention. For the purpose of brevity, primarily the differences of the alternative embodiments from the first-mentioned embodiment will be described.

Turning to FIG. 5, a first alternative rotary knife 100 is illustrated. The knife 100 includes a handle (not shown), an alternative blade housing 102, and a blade assembly 104. The blade housing 102 includes an annular ring 106 and a split flange 108. The ring 106 includes an inner arcuate surface 110 including an alternative groove 112. The groove 112 is substantially circular and uninterrupted. Moreover, the blade assembly 104 includes an annular bushing 114 placed within the groove 112. The uninterrupted form of the groove 112 permits the bushing 114 to be rotated to any desired rotational angle relative to the blade housing 102.

Turning to FIG. 6, a second alternative rotary knife 200 is illustrated. The knife 200 includes a handle (not shown), an alternative blade housing 202, and an alternative blade assembly 204. The blade housing 202 is unitary and includes a split annular ring 206 and a split flange (not shown). The ring 206 includes an outermost arcuate surface 208 and an inner surface 210 including an alternative groove 212 with a substantially semi-circular cross-section.

The blade assembly 204 includes an alternative annular blade 214 and an alternative annular bushing 216. The blade 214 is unitary and substantially endless. The blade 214 includes a blade wall 218 with a support section 220 and a cutting section 222. The support section 220 presents an outer annular groove 224. The groove 224 also includes a substantially semi-circular cross-section. The cutting section 222 extends axially from the support section 220. The blade 214 further includes a ring gear 226 extending from the support section 220 for mating with the spur gear (not shown). The cutting section 222 includes a cutting edge 228 spaced axially from the ring gear 226. The cutting section 222 also extends radially inwardly from the from the support section 220.

The bushing 216 includes an annular body 230 with terminal ends (not shown) that are normally spaced adjacent to each other so that the annular body 230 forms an essentially endless bearing surface. The body 230 has arcuate inner and outer perimeter surfaces 234,236 with substantially identical semicircular cross-sectional profiles and is, therefore, shaped like a torus. In other words, the bushing 216 has a circular cross-sectional shape as opposed to being D-shaped like the first preferred embodiment.

Figure 7:
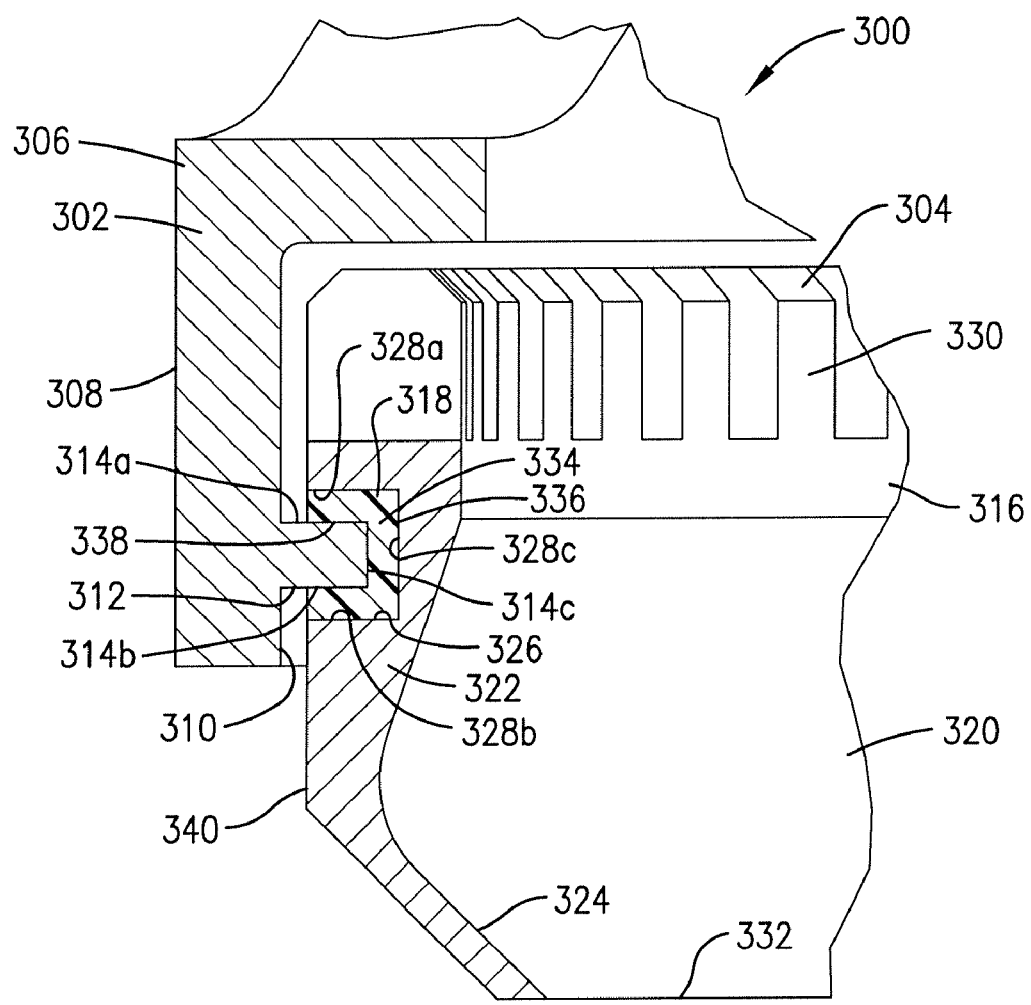
FIG. 7 is a fragmentary sectional view of a fourth embodiment of the present invention, showing an alternative blade housing, an alternative blade, and an alternative annular bushing.

Turning to FIG. 7, a third alternative rotary knife 300 is illustrated. The knife 300 includes a handle (not shown), an alternative blade housing 302, and an alternative blade assembly 304. The blade housing 302 is unitary and includes a split annular ring 306 and a split flange (not shown). The ring 306 includes a sidewall that presents an outermost arcuate surface 308 and an inner arcuate surface 310. The ring 306 also includes a raised annular lip 312 that is integral to the sidewall and extends radially inwardly therefrom. Specifically, the raised lip 312 forms part of the inner arcuate surface 310 and is raised from a remainder of the inner arcuate surface 310, i.e., extends radially inwardly from the remainder of the inner arcuate surface 310. In particular, the raised lip 312 presents opposite housing bearing surfaces 314a,b, and endmost housing bearing surface 314c. While the bearing surfaces 314a,b,c preferably include the raised, rectangular shape of lip 312, the principles of the present invention are applicable where bearing surfaces 314a,b,c include different raised features, such as pointed or rounded features, or include depressed features, such as those illustrated in the previous embodiments. Although the remainder of the inner arcuate surface 310 does not serve as a bearing surface in the illustrated embodiment, it is within the ambit of the present invention for the remainder of the inner arcuate surface 310 to provide a bearing surface for rotatably supporting at least part of the blade assembly 304 thereon. The illustrated lip 312 is preferably integrally formed with the sidewall. However, it is consistent with the principles of the present invention where the lip is removably attached to the sidewall, e.g., wherein the lip is formed by a snap ring that fits into a corresponding groove of the sidewall.

The blade assembly 304 includes an alternative annular blade 316 and an alternative annular bushing 318. The blade 316 is unitary and endless. The blade 316 includes a blade wall 320 with a support section 322 and a cutting section 324. The support section 322 presents an outer annular groove 326. The groove 326 preferably includes a substantially rectangular cross-sectional shape and presents opposed blade bearing surfaces 328a,b and inner blade bearing surface 328c. However, it is also consistent with the principles of the present invention where the bearing surfaces 328a,b,c present an alternative shape. For example, while the blade 316 preferably includes the groove 326 for being interconnected with the blade housing 302 as will be discussed, the principles of the present invention are also applicable where the blade 316 presents an outwardly extending projection such as a radially projecting lip with a profile similar to that of the lip 312.

The blade 316 further includes a ring gear 330 integral to and extending from the support section 322 for mating with the spur gear (not shown). The cutting section 324 extends axially from the support section 322 and includes a cutting edge 332 spaced axially from the ring gear 330. The cutting section 324 also extends radially inwardly from the support section 322.

The bushing 318 includes an annular body 334 with terminal ends (not shown) that are normally spaced adjacent to each other so that the annular body 334 forms an essentially endless bearing surface. The body 334 has arcuate inner and outer perimeter surfaces 336,338 that are nested so that the body 334 presents a substantially channel-shaped cross-section. While the illustrated perimeter surfaces 336,338 present substantially similar U-shaped profiles, albeit the profiles are differently sized, the principles of the present invention are applicable where the perimeter surfaces 336,338 present differently shaped profiles. For example, similar to the embodiment depicted in FIG. 4, the profile of surface 336 could have a convex arcuate shape. Furthermore, either of the perimeter surfaces 336,338 could present a profile with a convex shape, a concave shape, or a combination of both. Either of the perimeter surfaces 336,338 could also present a profile with arcuate features, angular features, or a combination of both.

The bushing 318 is configured to be received in the groove 326, with the inner perimeter surface 336 being received adjacent to the blade bearing surfaces 328a,b,c. Furthermore, the bushing 318 and groove 326 are configured to receive the raised lip 312, with the bearing surfaces 314a,b,c being received adjacent to the outer perimeter surface 338 of the bushing 318. In other words, the blade housing 302 presents a raised bearing race, i.e., the lip 312, and the blade 314 presents a complemental depressed bearing race, i.e., the groove 326. However, the principles of the present invention are equally applicable where the blade housing 302 and blade 314 present an alternative combination of bearing surfaces. For example, it is within the ambit of the present invention for the blade 314 to include a projecting lip with a profile that projects radially outwardly from a remainder of the blade 314, with the blade housing 302 presenting a complementally-shaped annular groove that receives the projecting lip. Furthermore, both the blade 314 and blade housing 302 could include respective projecting lips, e.g., oppositely projecting lips with the bushing 318 presenting a pair of opposite grooves for rotatably receiving corresponding ones of the lips therein. Moreover, it is consistent with the principles of the present invention where either or both of the blade housing 302 and blade 314 present a combination of raised or depressed surfaces that rotatably receive one another. For example, the blade housing 302 and blade 314 could each include bearing surfaces that form a plurality of corrugations, with each plurality of corrugations becoming interdigitated, i.e., intermeshed, with the other plurality of corrugations when the bearing surfaces are rotatably received by one another. In other words, such a corrugated construction of the bearing surfaces would present a labyrinth profile.

The illustrated bearing surfaces 314*a,b,c* and 328*a,b,c* are preferably continuous along the circumferential length of the blade housing 302 and blade 314 respectively. However, it is also consistent with the principles of the present invention where one or more of the bearing surfaces 314*a,b,c* and 328*a,b,c* are segmented, i.e., where a given one of the surfaces 314*a,b,c* and 328*a,b,c* presents a plurality of surface segments that are spaced apart from one another.

The illustrated rotary knife 300 also is preferably constructed so that, when the knife 300 is assembled, an innermost diameter of the surface 310, i.e., on the raised lip 312, is smaller than an outermost diameter of the blade 314, i.e., along an outermost surface 340. In this manner, the blade 314 is restricted from being dislodged from rotating engagement with the blade housing 302. However, it is within the ambit of the present invention where the innermost diameter of the surface 310 is larger than the outermost blade diameter, as in the previous embodiments.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A rotary knife driven by a power source, the rotary knife comprising:
    a grasping handle;
    a blade housing mounted to the handle;
    an annular blade operable to be driven by the power source,
    said blade housing presenting an annular inwardly facing housing bearing surface,
    said annular blade presenting an annular outwardly facing blade bearing surface in an opposed relationship with the housing bearing surface; and
    an annular bushing received on the bearing surfaces,
    said annular bushing rotatably supporting the blade relative to the blade housing,
    said bushing including an elongated bushing body,
    said bushing body terminating at spaced-apart circumferential ends and presenting a circumferential length defined between the ends.

2. The rotary knife as claimed in claim 1,
    said blade rotating about a rotational axis,
    at least one of said bearing surfaces of the blade housing and the blade comprising a projection extending at least partially radially relative to the rotational axis,
    said bushing including a circumferentially extending bushing groove receiving the projection therein.

3. The rotary knife as claimed in claim 2,
    the other of said bearing surfaces of the blade housing and blade including a groove that at least partly receives the radially extending projection therein.

4. The rotary knife as claimed in claim 2,
    said projection extending generally orthogonal to the rotational axis.

5. The rotary knife as claimed in claim 2,
    said projection and said at least one of the bearing surfaces from which the projection extends being integrally formed.

6. The rotary knife as claimed in claim 5,
    said projection presenting a substantially rectangular cross-sectional shape.

7. The rotary knife as claimed in claim 1,
    said blade rotating about a rotational axis,
    said housing bearing surface comprising a projection that extends at least partially radially inward relative to the rotational axis,
    said bushing including a circumferentially extending bushing groove receiving the projection therein.

8. The rotary knife as claimed in claim 7,
    said projection extending continuously along a circumferential direction.

9. The rotary knife as claimed in claim 7,
    said blade housing including a generally cylindrical sidewall that presents an inner surface,
    said projection extending radially inwardly from the inner surface.

10. The rotary knife as claimed in claim 7,
    said blade bearing surface defining a blade groove, with the annular bushing being received therein.

11. The rotary knife as claimed in claim 10,
    said projection extending at least partly into the blade groove.

12. The rotary knife as claimed in claim 7,
    said bushing body presenting oppositely facing inner and outer circumferential surfaces,
    said outer circumferential surface defining the bushing groove that receives the radially extending projection.

13. The rotary knife as claimed in claim 12,
    said bushing body being deformable to permit positioning of the bushing body between the bearing surfaces and to assume a generally circular shape when positioned therein, with the circumferential ends being in close proximity with one another.

14. The rotary knife as claimed in claim 13,
    said bushing body being unitary.

15. The rotary knife as claimed in claim 7,
    said projection presenting a radially innermost diameter dimension that is smaller than an outermost diameter dimension of the blade such that, when the projection is received at least partly within the blade groove, the blade is restricted from dislodgement from rotating engagement with the blade housing.

16. The rotary knife as claimed in claim 1,
    said bushing including an inner cross-sectional profile and an outer cross-sectional profile,
    said inner cross-sectional profile conforming substantially to the blade bearing surface,
    said outer cross-sectional profile conforming substantially to the housing bearing surface.

17. The rotary knife as claimed in claim 16,
    said profiles being shaped similarly to one another.

18. The rotary knife as claimed in claim 17,
    each of said profiles being substantially uniform along the circumferential length of the bushing body.

19. The rotary knife as claimed in claim 18,
    said blade bearing surface and said housing bearing surface being substantially radially nested such that the bushing body presents a substantially channel-shaped cross-section.

20. The rotary knife as claimed in claim 19,
    said profiles each presenting a U-shaped configuration.

21. The rotary knife as claimed in claim 1,
said bushing including a material selected from the group consisting of ABS, Acetal, brass, aluminum, stainless steel, and combinations thereof.

22. The rotary knife as claimed in claim 1,
said annular blade including a ring gear,
said handle including a spur gear operable to be driven by the power source,
said gears being drivingly intermeshed.

23. The rotary knife as claimed in claim 22,
said spur gear configured to be pneumatically driven by the power source.

24. The rotary knife as claimed in claim 1, said housing including a radially projecting end wall that terminates the annular inwardly facing housing bearing surface.

25. The rotary knife as claimed in claim 24,
one of said circumferential ends of the bushing body being disposed generally adjacent the end wall such that the one circumferential end is maintained in spaced relationship from the other circumferential end of the bushing body.

26. The rotary knife as claimed in claim 25,
said housing including a pair of the radially projecting end walls.

27. The rotary knife as claimed in claim 26,
one of said circumferential ends of the bushing body being disposed generally adjacent one of the pair of end walls and the other circumferential end of the bushing body being disposed generally adjacent the other end wall such that the circumferential ends are maintained in spaced relationship from one another.

28. The rotary knife as claimed in claim 1,
said bushing body being deformable to permit positioning of the bushing body between the bearing surfaces and to assume a generally circular shape when positioned therein, with the ends being in close proximity with one another.

29. The rotary knife as claimed in claim 1,
said bushing body being unitary.

30. A replacement blade assembly for a rotary knife driven by a power source, wherein the rotary knife includes a housing that presents an annular inwardly facing housing bearing surface, said replacement blade assembly comprising:
an annular blade operable to be driven by the power source,
said blade presenting an annular outwardly facing blade bearing surface configured to be in an opposed relationship with the annular inwardly facing housing bearing surface; and
an annular blade-supporting bushing received on the annular outwardly facing blade bearing surface and configured to be received on the annular inwardly facing housing bearing surface,
said annular blade-supporting bushing operable to rotatably support the blade relative to the housing,
said annular blade-supporting bushing including an elongated bushing body,
said bushing body terminating at spaced-apart circumferential ends and presenting a circumferential length defined between the ends.

31. The replacement blade assembly as claimed in claim 30,
said blade bearing surface defining a blade groove, with the annular bushing being received therein.

32. The replacement blade assembly as claimed in claim 30,
said bushing body presenting oppositely facing inner and outer circumferential surfaces,
said outer circumferential surface defining a bushing groove configured to receive the housing bearing surface.

33. The replacement blade assembly as claimed in claim 32, said bushing body being deformable to permit positioning of the bushing body between the bearing surfaces and to assume a generally circular shape when positioned therein, with the circumferential ends being in close proximity with one another.

34. The replacement blade assembly as claimed in claim 33,
said bushing body being unitary.

35. The replacement blade assembly as claimed in claim 30,
said bushing including an inner cross-sectional profile and an outer cross-sectional profile,
said inner cross-sectional profile conforming substantially to the blade bearing surface,
said outer cross-sectional profile configured to conform substantially to the housing bearing surface.

36. The replacement blade assembly as claimed in claim 35,
said profiles being shaped differently from one another.

37. The replacement blade assembly as claimed in claim 35,
each of said profiles being substantially uniform along the circumferential length of the bushing body.

38. The replacement blade assembly as claimed in claim 35,
said profiles being shaped similarly to one another.

39. The replacement blade assembly as claimed in claim 30,
said bushing including a material selected from the group consisting of ABS, Acetal, brass, aluminum, stainless steel, and combinations thereof.

40. The replacement blade assembly as claimed in claim 30,
said bushing body being deformable to permit positioning of the bushing body between the bearing surfaces and to assume a generally circular shape when positioned therein, with the ends being in close proximity with one another.

41. The replacement blade assembly as claimed in claim 30,
said bushing body being unitary.

* * * * *